…

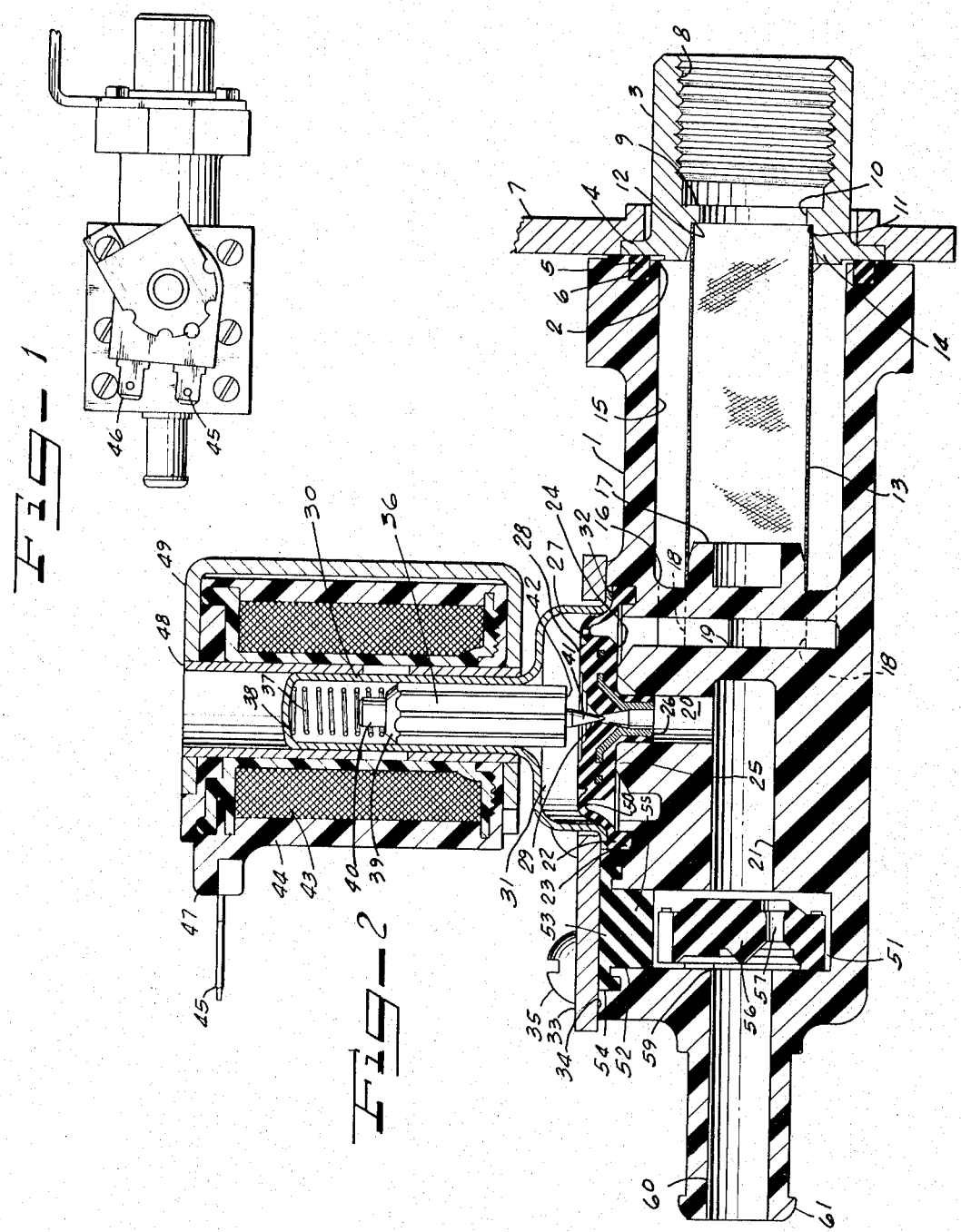

United States Patent Office 3,363,763
Patented Jan. 16, 1968

3,363,763
SNAP ACTING VALVE HAVING FILTER AND FLOW CONTROL MEANS
Howard L. Erickson, Bensenville, Ill., assignor to The Dole Valve Company, Morton Grove, Ill., a corporation of Illinois
Filed June 25, 1965, Ser. No. 467,044
1 Claim. (Cl. 210—137)

ABSTRACT OF THE DISCLOSURE

A solenoid operated valve having inlet and outlet passageways, a control passageway separated from a filter chamber by a partition which has uniformly distributed holes therein and a boss thereon, one end of a hollow cylindrical filter element seated on said boss and the other end extending outside an end of said filter chamber and seating in a recess in an inlet adaptor, said outlet passageway having a flow control means therein.

---

This invention relates to a water valve and in particular to a dishwasher valve having novel filter and flow control structures.

The recent emphasis in the home appliance field has been to expand the market for the previously considered luxury appliances such as dishwashers, clothes dryers and the like. To accomplish this objective improvements are needed for decreasing the cost and maintenance without decreasing the quality of these devices. This invention contemplates such an improvement.

Filter screens heretofore used in dishwasher valves have usually been seated in close proximity with the walls forming the inlet passageway such that regardless of the screen configuration the effective filter capacity has been substantially limited to its cross-sectional area. In addition these screens have characteristically been held in place by supplementary spring loaded fixtures adding further to the cost of the valve assembly.

While improvements are required in the filter structure, like improvements are demanded in respect to the provision for a flow control device.

Flow control devices are common in dishwasher valves and their installation and removal has usually been made possible by constructing a valve outlet in two sections. The sections are separated and the flow control is inserted in the outlet passageway. This structure reflects two principal drawbacks, however. The first is the high cost of providing such an outlet. The second is the high cost of maintenance that is associated with the need to disassemble the principal flow line to replace the flow control device.

Therefore it is an object of this invention to provide a dishwasher valve having improved qualities that reflect a reduction in cost and maintenance requirements.

It is also an object of this invention to provide a dishwasher valve having a novel filter assembly characterized by an increased filter capacity and an efficiently supported and readily removable filter screen.

It is another object of this invention to provide a dishwater valve having an improved structure for receiving a flow control device and for permitting this device to be easily replaced without disengaging the principal flow line.

These and other objects, features and advantages of the present invention will be understood in greater detail from the following description and the associated drawings wherein reference numerals are utilized in designating a preferred embodiment and wherein:

FIGURE 1 is a top view showing the general external features and configuration of the dishwasher valve according to this invention, and FIGURE 2 is a longitudinal sectional view of the valve shown in FIGURE 1 illustrating the internal operation thereof.

A preferred embodiment of the dishwasher valve of the present invention is shown in FIGURE 2 and comprises generally a straight through body configuration having a solenoid operated valve means disposed within the flow path for controlling the passage of fluid therethrough. At the inlet side of the valve member is a filter chamber having a cylinder screen for filtering the inlet flow, while at the outlet side a constant rate of flow control device is disposed within the flow path. It is to these two latter features that this invention is directed.

Referring to FIGURE 2 in greater detail there is shown a valve body 1 having an inlet 2 and a threaded inlet adapter 3 secured thereto for being connected to a source water line. The adapter 3 is suitably secured to the inlet 2 at an outwardly extending flange 4 for making a pressure seal with a rubber gasket 5 fitted into a complementary groove 6. Also, the inlet adapter 3 has a supporting bracket 7 rigidly mounted thereon for insulating the valve body 1 from any torque associated with making and breaking the threaded connection to the source water line. For making such a connection, the adapter 3 is provided with an internally threaded port 8 disposed axially of the inlet 2. The port 8 narrows to define a shoulder 9 for forming a passageway 10 having a diameter substantially equal to the internal diameter of a water line to be threaded within the adapter 3.

The passageway 10, however, widens for forming a cylindrical wall 11 and for defining a filter seat 12 thereby. The wall 11 is provided to be a proper diameter for operably receiving the filter screen 13 therein. It should be noted that the enlarged passageway wall 11 has a chamfered face 14 formed at the inner surface of the adapter 3 for guiding the cylindrical screen 13 into position at the filter seat 12.

The inlet 2 leads directly to a cylindrical filter chamber 15 having an end wall 16 and a cylindrical boss 17 formed centrally thereof. Here it can be seen that the boss 17 cooperates with the radially enlarged passageway wall 11 for positioning the filter screen 13 axially within the filter chamber 15. Also, the end face 16 cooperates with the filter seat 12 for positioning the screen 13 longitudinally within the chamber 15.

By this construction, therefore, it is observed that the screen 13 can be easily removed and cleaned or replaced simply by removing the inlet adapter 3 and sliding the screen from its position about the boss 17. It merits noting that no external fixtures or springs are required for positioning or removing the screen 13. It may also be observed that by this configuration the effective filter capacity of this valve is extended, in that the filter screen 13, rather than being disposed transversely to the chamber 15, is oriented longitudinally therein.

The flow path of this valve may be traced from the interior of the cylindrical screen 13 to the tubular region intermediate the screen walls and the parallel inner surface of the chamber 15. From this region connecting passageways 18 are provided through the end wall 16 to a wafer shaped chamber 19. It can be appreciated that were the solenoid actuated valve in an opened position, the flow path would be continuous from the chamber 19 through a connecting leg 20 to the main outlet passageway 21.

The valve means provided between the chamber 19 and the leg 20 is of the pilot operated variety which is well understood in the art and which comprises generally a resilient diaphragm having an outer bead 22 fitted within an annular groove 23 formed within the valve body 1.

The diaphragm has a valve head 24 contacting a valve seat 25 and a depending tubular section 26 received within the connecting passageway 20. Also, a bleed port 27 is provided within the diaphragm web to permit fluid under pressure to be received at the upper surface 28 of the head 24. Finally, the pilot operated diaphragm is provided with a center orifice 29 disposed for being engaged by a valve pin associated with the solenoid actuated assembly.

The principal supporting structure for both the solenoid assembly and the resilient diaphragm is the armature guide 30 which widens to form a pressure chamber 31 just above the upper surface 28 of the diaphragm head 24. The pressure chamber 31 has an outwardly extending lip 32 for abutting the outer diaphragm bead 22 and for being clamped into position at the valve body by a pressure plate 33 which is secured to the plane face 34 by a plurality of fasteners 35.

The armature guide 30 has a magnetic stainless steel armature core 36 slidably received therein for being biased into engagement with the center orifice 29. This biasing force is provided by a coil spring 37 disposed intermediate the end face 38 of the armature guide 30 and the upper surface 39 of the armature itself. It may be noted that a guide post 40 is provided at the face 39 for maintaining the coil spring in an axial position relative to the armature 36. Engagement with the center orifice 29 is accomplished through an armature pin 41 depending from the lower armature face 42.

The solenoid, itself, consists of a winding 43 suitably disposed within a supporting shell 44 having prongs 45 and 46 connected to the winding terminals and extending from the reinforced lip 47. The shell 44 is fixedly mounted to the outside surface of a pole piece 48 which in turn is slip fitted about the armature guide 30. To complete the solenoid assembly a C-frame 49 is received about the outer surface of the shell 44 for providing a magnetic flux path for the coil 43.

The principal feature to be noted about the operation of a pilot operated diaphragm is that the valve pin 41 is employed only to close the center orifice 29 and not to provide the sealing force for the diaphragm itself. The diaphragm head 24 is held into engagement with the valve seat 25 through the differential between the fluid forces operating above and below the diaphragm. This differential derives from the fact that in the seated position the pressure inside the seating ring or tubular section 26 is at atmospheric pressure. The pressure density at the upper surface 28 will be equal to the pressure density at the lower surface 50 due to the pressure connection provided by the bleed port 27. However, the effective area exposed to this pressure density is considerably greater at the upper surface 28. Hence, the net effect will be a downward force for engineering the valve seat 25.

When, however, the winding 43 is energized, the armature 36 will be withdrawn against the spring 37 for removing the valve pin 41 from the center orifice 29. The result is that the fluid pressure at the upper diaphragm surface 28 will be effectively reduced due to a sudden passage of fluid through the orifice 29. Therefore, the net pressure differential will be favorable for raising the diaphragm head 24 off the valve seat 25 to provide a direct communication between the wafer shaped chamber 19 and the passageway 20.

With the resilient diaphragm in a fully opened position a flow path will be provided to the outlet passageway 21 which connects directly to a flow control chamber 51. The chamber 51 is defined through the combination of a slot 52 depending from the plane face 34 and a resilient plug 53 disposed at the entrance to the slot 52. The plug 53 consists of a seal collar 54 and a depending stopper 55. The plug 53 is maintained within the slot 52 by the pressure plate 33 which is also used for positioning the bead 22 of the pilot operated diaphragm.

A tri-orifice flow control device 56 is shown disposed within the flow control chamber 51. The device 56 has three flow ports 57 disposed radially about the center thereof for controlling the rate of fluid flow within the outlet passageway 21. Also, the device 56 is loosely received within the chamber 51 to allow a by-pass flow of fluid around the edges thereof at low pressures. At high fluid pressures this by-pass flow is shut off. In both cases flow control is achieved by allowing the device 56 to bend under fluid pressure for restricting the flow ports 57 and for blocking the by-pass flow. The result is that the flow finally received at the nozzle 60 will be maintained at a uniform predetermined rate satisfactory for use in a dishwasher sprinkling system. It may be noted that the nozzle 60 is provided with a lip 61 for making a pressure connection with a flexible hose conducting to such a system.

It will be understood that various modifications may be suggested by the embodiment disclosed, but I desire to claim within the scope of the patent warranted hereon all such modifications that come within the scope of my invention.

I claim as my invention:
1. A fluid control valve comprising:
   a valve body having an inlet leading thereinto and an outlet passageway extending therefrom,
   a filter chamber conducting from said inlet,
   a control passageway communicable with said filter chamber in conducting to said outlet pasageway,
   snap acting valve means disposed within said control passageway for regulating the flow of fluid between said inlet and said outlet passageway,
   said filter chamber having an end wall partitioning the filter chamber and the control passageway,
   said end wall having a boss protruding therefrom into said filter chamber and being substantially axially orientated therein,
   a number of openings distributed substantially uniformly around said boss and communicating said filter said inlet and said outlet passageway,
   a cylindrical filter screen having a first end slidably received about said cylindrical boss and a second end extending beyond the plane of said inlet for being outside said filter chamber,
   said inlet having an adaptor removably secured thereto for being connected to a fluid pressure source,
   said adaptor having a port extending therethrough for communicating said inlet with a fluid pressure source,
   said port having an inner section thereof radially enlarged for defining a filter seat spaced inwardly of the inner face of said adaptor,
   said outer end of said filter screen being received within said enlarged section at said filter seat,
   a slot formed within said valve body substantially perpendicular to and extending across said outlet passageway, and
   a constant rate of flow control device slidably fitted within said slot and regulating the rate of flow through said outlet passageway.

References Cited

UNITED STATES PATENTS

| | | | |
|---|---|---|---|
| 986,678 | 3/1911 | Bordo | 210—453 X |
| 1,570,073 | 1/1926 | Olsen | 210—453 |
| 2,815,041 | 12/1957 | Rimsha et al. | 138—45 X |
| 2,880,753 | 4/1959 | Wilkins | 137—549 |
| 2,934,088 | 4/1960 | Chace | 138—45 X |
| 3,141,477 | 7/1964 | Campbell et al. | 138—45 |
| 3,195,561 | 7/1965 | Sovitzky | 251—120 X |

FOREIGN PATENTS

| | | |
|---|---|---|
| 378,455 | 2/1940 | Italy. |
| 641,994 | 7/1962 | Italy. |
| 50,236 | 2/1932 | Norway. |

REUBEN FRIEDMAN, *Primary Examiner.*

F. A. SPEAR, *Assistant Examiner.*